United States Patent [19]

McLaen

[11] Patent Number: 4,965,177

[45] Date of Patent: Oct. 23, 1990

[54] ACTIVATOR SOLUTION WITH COLD IMAGE TONE-PROVIDING AGENT

[75] Inventor: Donald F. McLaen, Rochester, N.Y.

[73] Assignee: Eastman Kodak Company, Rochester, N.Y.

[21] Appl. No.: 388,412

[22] Filed: Aug. 2, 1989

[51] Int. Cl.[5] .......... C03C 5/29

[52] U.S. Cl. .......... 430/405; 430/448; 430/486; 430/490

[58] Field of Search .......... 430/405, 448, 486, 490, 430/965

[56] References Cited

U.S. PATENT DOCUMENTS

| | | | |
|---|---|---|---|
| 2,607,686 | 8/1952 | Current | 430/370 |
| 3,515,555 | 6/1970 | Fassbender | 430/370 |
| 3,619,186 | 11/1971 | Parsons | 430/232 |
| 4,124,390 | 11/1978 | Kohn | 430/390 |
| 4,436,805 | 3/1984 | Iguchi et al. | 430/248 |

FOREIGN PATENT DOCUMENTS

| | | |
|---|---|---|
| 1801330 | 4/1970 | Fed. Rep. of Germany . |
| 497481 | 12/1938 | United Kingdom . |

OTHER PUBLICATIONS

G. Haist, Modern Photographic Processing, vol. 1, 1979, pp. 260-262, John Wiley and Sons, N.Y.

B/W Print Processing with the Kodak Royalprint Processor, 1980.

Operating the Kodak Royalprint Processor Model 417, Nov., 1984.

Maintaining the Kodak Royalprint Processor Model 417, Nov., 1984.

*Primary Examiner*—Paul R. Michl
*Assistant Examiner*—Janet C. Baxter
*Attorney, Agent, or Firm*—Robert A. Linn

[57] ABSTRACT

Potassium iodide (or a related iodide) when incorporated in an alkaline activator for use in a rapid access processor using developer-incorporated, resin-coated paper, (i) produces a cold image tone in black-and-white photographic prints, and (ii) maintains the image tone of a large number of prints within a narrow image tone range over a (one week or one thousand 8×10 inch print) design life of the activator solution.

3 Claims, 2 Drawing Sheets

ACTIVATOR SOLUTION WITH COLD IMAGE TONE-PROVIDING AGENT

FIELD OF THE INVENTION

This invention relates to processing black and white photographs. More specifically, it relates to the production of such photographs (with a cold image tone) by a rapid access processor. Thus, this invention relates to image tone control in photographic prints made by an automated apparatus. The apparatus makes prints from developer incorporated, water resistant papers by the "activation" process.

The invention provides new compositions of matter, and methods for their use.

The invention is especially adapted for use with the KODAK ROYALPRINT Processor, a product of the Eastman Kodak Company.

BACKGROUND OF THE INVENTION

The image tone of black-and-white photographic prints made by an automated processor is dependent, at least to some extent, on the paper employed and the number of prints made with the batch of chemicals used. Prior to this invention, the image tone of a small initial number of prints for some developer incorporated papers generally had a blue tone which, after about 25 or 50 or other such small number of prints, became noticeably warmer, i.e., more yellow. Furthermore, prior to this invention, it had been noted that over the useful life of the chemicals previously available, that the image tone of the prints produced could vary somewhat, and in a non-controlled fashion.

In some instances, these operating factors may be considered to be less than optimum. For example, if multiple prints of a machinery part or similar device are to be made for some professional purpose, e.g., advertising, or publicity, it may be desired by the customer to have an image tone which is more uniformly colder than what was heretofore available. More specifically, the customer may wish to have the image tone remain relatively constant within an acceptable range, over say about 1000 prints, so that each recipient of a print copy receives about the same print as every other recipient. The present invention satisfies this need.

Fast black and white photographic print processing is achieved by the aforementioned commercial processor, which has been on the market for some time. The processor is designed to process black-and-white papers that have a developer incorporated emulsion on a water-resistant, resin-coated base. In the processor, chemicals are used over and over again to produce a large number of prints. In other words, the processor uses a batch of processing chemicals until the operator replaces them with another batch. During operation, a small amount of activator solution is continuously added. This replaced the small amount of activator which is lost with each print. It is currently recommended that the chemicals be replaced after one week, i.e., five days of use, or after they have been employed to make one-thousand $8 \times 10$ inch ($20.3 \times 25.4$ cm) prints or the equivalent, whichever occurs first.

Because of the use conditions associated with automated processors, development of a toning agent for such devices is a difficult task. This is especially true when a high degree of uniformity and controllability of image tone are among the objectives. For example, as stated above, such a processor is designed to prepare a large number of prints before the batch of chemicals is replaced. Hence, the toner chemical must perform in substantially the same way, time after time, in a constantly changing environment. One reason why the environment is constantly changing is the buildup of by-products of development produced each time the activator is used. Thus, the toner chemical must operate in the same way when there is no, little, some, or much by-product (from the development process) available in the solution in which the toner is employed. Moreover, toner chemical, and by-product(s) therefrom are carried downstream with each print. These materials should not harm the downstream operations.

Applicant set out to develop a system which would provide a cold image tone in black-and-white photographic prints made (from papers which did not provide such a cold tone) by a high speed automated processor (such as the aforementioned commercial unit). He also set out to develop a system in which the image tone remained within a relatively narrow tone range over the recommended useful life time of the chemicals used, i.e., over a relatively large number of prints. During the course of his studies, it was discovered that incorporation of potassium iodide in the activator solution unexpectedly accomplished both goals. It is believed that this discovery provides a significant advance in the art.

RELATED ART

Applicant is unaware of any reference which suggests this invention. Thus, Applicant is unaware of any prior art reference suggesting incorporation of a cold tone-providing agent of this invention in an alkaline activator for use in the preparation of black-and-white photographic prints by an activation process. He is also unaware of any reference suggesting the use of an activator/tone providing composition of this invention in a rapid process for preparing the equivalent of about one-thousand $8 \times 10$ inch ($20.3 \times 23.4$ cm) prints with the same batch of chemicals.

G. Haist, *Modern Photographic Processing,* Volume 1, John Wiley & Sons, New York (1979), page 260, discloses that potassium iodide is known as an anti-foggant. In the paragraph bridging pages 260 and 261 it is stated;

"Once the minimum point of solubility of silver bromide in potassium bromide solutions is passed, the silver bromide becomes more soluble because of the formation of complex ions of silver and bromide. High concentrations of potassium bromide, and potassium iodide as well, have such a great solubility effect on silver bromide that such concentrated solutions may be used to dissolve rapidly all the unused silver bromide in the emulsion layer. The color of developed silver may become warmer in tone when a considerable quantity of potassium bromide is present in the developer."

In the paragraph bridging pages 261 and 262, and in the first full paragraph on page 262 it is stated;

"At low concentrations potassium iodide is also an effective fog restrainer. For shorter times of development A. P. H. Trivelli and E. C. Jensen found the fog-removing power of potassium bromide to be greater than that of potassium iodide, but for longer times of development potassium iodide had the greater fog-suppressing power. Potassium iodide forms the very insoluble silver iodide when the potassium iodide reacts with silver ions. In practice the quantities of potassium iodide added to the developer are less than those of potassium bromide. Quantities of potassium iodide greater than 0.1% are rarely used because of the great retardation of development and the difficulty in fixing out the silver iodide that is formed.

If both potassium iodide and potassium bromide are present in the developer, the restraining action is at first due primarily to the iodide. When the iodide is used up, then the bromide is the restrainer. In this way developers may be compounded that exhibit equal restraint as the developing agents undergo exhaustion. Sodium or potassium chloride shows some restraining action, especially with chloride emulsion layers, but soluble chloride is little used commercially. Under certain conditions H. D. Murray and D. A. Spencer found sodium thiosulfate to be more effective in repressing fog than a soluble bromide."

Thus, it is known in the art to use potassium iodide for a different purpose and at much lower concentrations than in the instant invention.

U.S. Pat. No. 2,607,686 discloses a process of obtaining cold sepia tones by toning warm toned positive printing papers. The process consists of exposing and developing the papers with a silver halide developing agent and from 20–80 grams of KBr per liter, fixing and washing the developed print, and subsequently toning it with a sulfur or selenium toner.

U.S. Pat. No. 3,515,555 discloses that toning compositions containing an inorganic sulfur-containing compound, an alkali metal hydroxide, a thioamine, and an alkali metal iodide produce a warmer tone than previously obtained on direct positive photographic paper.

U.S. Pat. No. 3,619,186 discloses a receiving layer for use in a photographic diffusion transfer process which contains an iodide such as potassium iodide. A neutral (cold) tone is obtained. The presence of potassium iodide in the silver halide emulsion and in the developer does not have the same beneficial effect on tone.

U.S. Pat. No. 4,124,390 discloses a mordanting solution consisting essentially of an aqueous alkaline solution of one or more complexing agents which form an insoluble stable salt complex with the metallic silver of a photographic image. Potassium iodide is given as an example of a complexing adjuvant which may optionally be present (Column 6, lines 31–68).

U.S. Pat. No. 4,436,805 discloses a developer for use in a silver complex transfer process. The developer contains a nitrogen-containing heterocyclic compound of a defined type, and an alkali solution iodide. The heterocycle and iodide are used in a molar ratio of 1:5 to 5:1. Transferred silver images of improved color tone, maximum density, contrast, and sharpness can be obtained.

Great Britain No. 497,481 discloses solutions for reducing the tonal values of black-and-white prints that are to be tinted. One such solution contains potassium iodide and iodine dissolved in water.

DT No. 1,801,330 discloses shortening the transfer time in diffusion transfer process by incorporating iodide ions into developer or activator solution. Positive silver images in excellent black tones are obtained.

SUMMARY OF THE INVENTION

This invention pertains to cold image tones in black-and-white photographic prints made by a rapid access processor, using developer-incorporated, resin-coated paper, and an activate-stop-fix-wash-dry operation cycle. This invention also pertains to maintaining the image tone in a large number of such prints within a narrow, cold tone range. Thus, for example, the image tone-providing compound of this invention can maintain the image tone within a desired cold tone range for about one-thousand 8×10 inch (20.3×25.4 cm) prints, or equivalent. In this manner, the agent of this invention allows the processor to produce a cold image tone, within acceptable limits, throughout the design life of the batch of chemicals provided for use in the apparatus.

The improvements of this invention are obtained by using in the alkaline activator, a cold image tone providing amount of potassium iodide, or a related compound. The preferred range is 1.0 to 8.0 grams per liter. Concentrations somewhat outside this range can be used, if desired.

This invention also provides an activator/image tone-providing composition for use with the processor. The activator comprises an alkali and one of the aforementioned iodides. If desired, a mixture of iodides can be present in the compositions of this invention.

DESCRIPTION OF THE DRAWINGS

The drawing in FIG. 1 is a schematic representation of the aforementioned high-speed processor which is useful in the practice of the invention. Processor 10 is a self-threading, roller-transport processor designed to process black-and-white papers that have an incorporated developer emulsion on a resin-coated base.

Papers suitable for use in the processor include KODABROME II RC, KODAK POLYCONTRAST Rapid II RC, KODAK PANALURE II RC, KODAK PREMIER II RC, KODAK POLYCONTRAST III, and Ilford Multigrade II and III papers.

Figure 1:
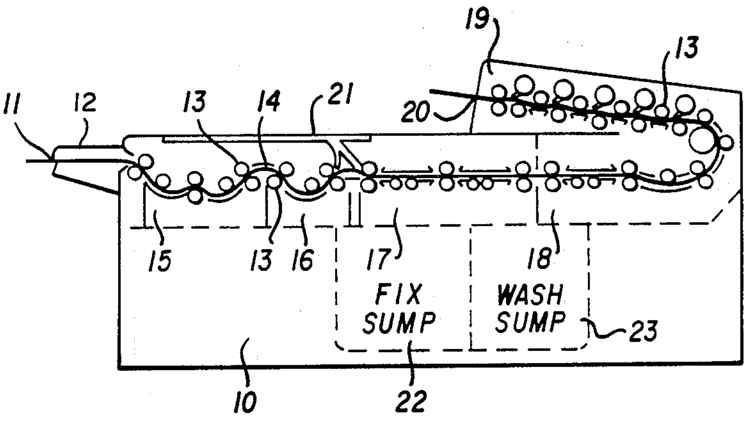

The processor makes use of the activation-conventional process (in short, the activation process). That process has the following operative steps: activate-stop-fix-wash-dry.

Processor 10 has paper feed slot 11 in feed tray 12. The paper can be up to 17 inches (40.3 cm) wide such as two 8×10 inch (20.3×24.5 cm) sheets side by side. For proper transport, the minimum paper length is five inches (12.7 cm).

When activated, the paper being processed is moved by rollers 13 along path 14 through three processing chemical solutions, viz an activator in activate station 15, a stop bath in stop station 16, and a fixer in fix station 17. There is also a wash station 18, and a dryer station 19.

As shown, dryer station 19 is partially over wash station 18 and feeds back finished prints through slot 20 toward the operator, for ease of operation.

Dye-to-dry time for an 8×10 inch (20.3×25.4 cm) print is about 55 seconds. For even more rapid access, the processor has wet print station 21 with a hinged cover (not shown), which allows the operator to inspect a print as soon as it has passed through the stop solution-about 21 seconds for an 8×10 inch (20.3×25.4 cm) sheet-and then reinsert it for process completion.

Using, visual inspection at wet print station 21, judgments as to density level and exposure can be made under safelight or white-light conditions. A satisfactory print can then be returned to the processor for fixing, washing, and drying.

In the processor, the paper transport speed is 6 feet (18.3 meters) per minute, which allows up to 720 Prints (8×10 inch 20.3×25.4 cm) per hour, when the paper is fed into the machine with a 2-inch (5.1 cm) spacing between sheets and the sheets are fed two at a time, side by side.

For use with activate station 15, there is a replenishment source (not shown) of activator/toner solution. It holds two liters of activator/toner solution. The solution is slowly fed into the activator station through a liquid level control valve, activated by the liquid level in the activator station. This replenishes the small amount of activator/tone providing solution which is carried downstream with each print.

The activate station holds four liters of activate/tone providing solution. In one mode of operation which is preferred, a master solution of tone providing agent in a suitable solvent is added to the activator to prepare the activator/tone providing solution. For such purpose, a 400 g portion of tone providing agent, e.g., potassium iodide, KI, is dissolved in enough suitable solvent to make one liter, and the solution made available in 60 ml bottles. Twenty milliliters are added to the replenishment unit and 40 milliliters to the activator bath to give a nominally four grams/liter concentration of KI.

The processor and its operation and maintenance are described in: B/W Print Processing With The KODAK ROYALPRINT Processor (1980); Operating The KODAK ROYALPRINT Processor Model 417 (November 1984); and Maintaining the KODAK ROYALPRINT Processor Model 417 (November 1984). These publications are available from the Professional and Finishing Markets Division, Eastman Kodak Co., Rochester, N.Y. 14650. The publications are incorporated by reference herein as if fully set forth.

Figure 2:
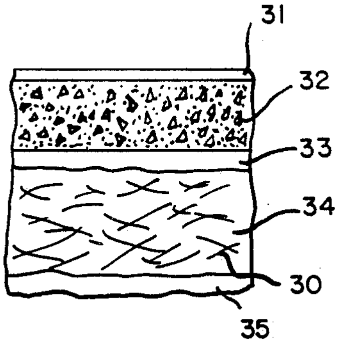

FIG. 2 is a cross section, not to scale, of a paper for activation processing, suitable for use in the processor of FIG. 1. Activation paper 30, has a gelatin overcoat 31. Layer 32 is a hardened gelatin emulsion containing silver halide crystals and developing agent (for example, hydroquinone) granules dispersed therein. Layer 33 is a pigmented resin layer, and layer 34 is a photographic paper base. Resin layer 35 at the underside of the base makes the paper more suitable for use in aqueous solutions. Such papers are known in the art.

Water-resistant papers, such as those described above, are made by coating the paper base on both sides with a resin layer. The coating on the emulsion side, which replaces the baryta coating on conventional papers, is pigmented white, or the same color as the paper tint. This pigmenting is unnecessary on the base side. Water does not penetrate the resin coating, and thus the conventional processing of resin coated papers requires a shorter time.

Because the fixer solution, with its dissolved silver-salt content, does not penetrate the paper base, the wash time is shortened considerably.

The big saving in processing time for water-resistant papers occurs in the washing step. Further, prints made on water-resistant papers air-dry much faster than prints made on conventional papers.

Figure 3:
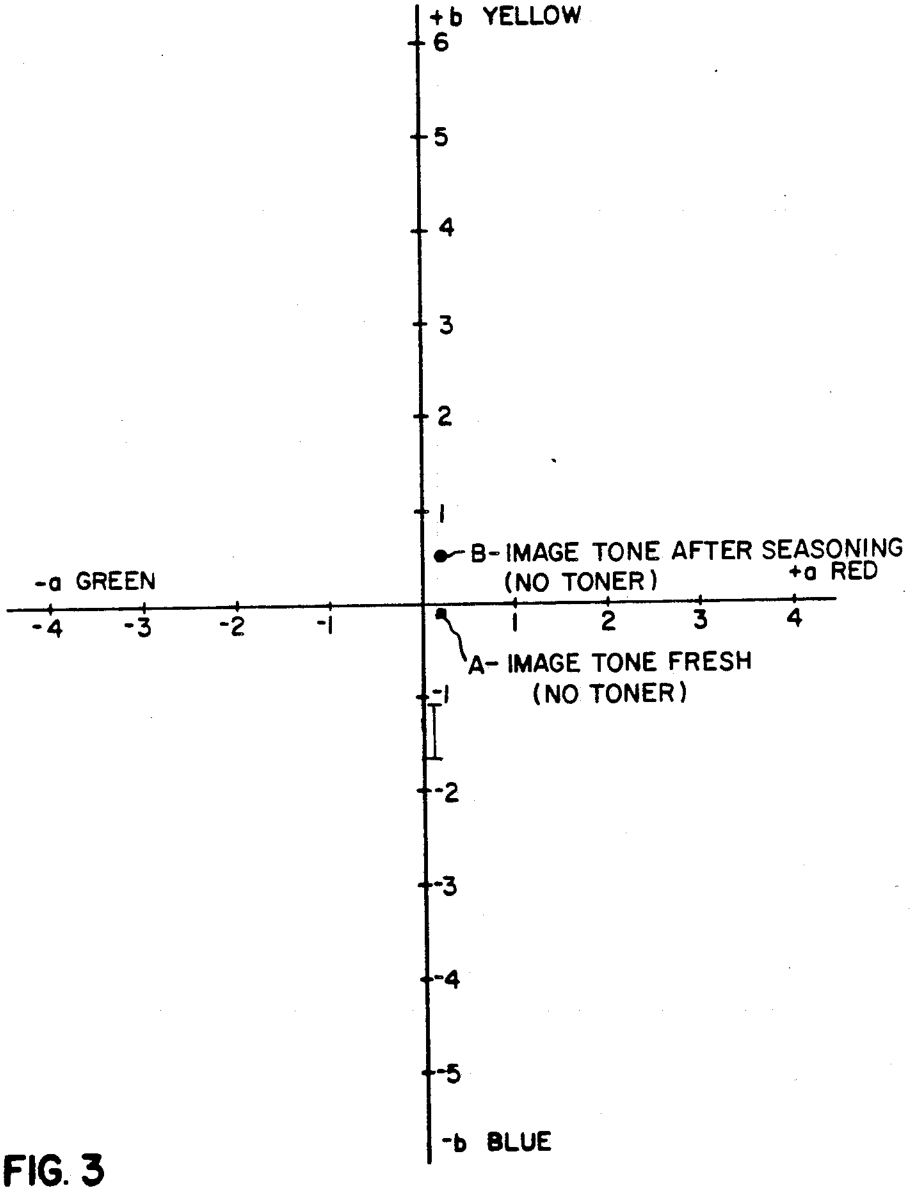

FIG. 3 is a graphical representation of the results obtained by use of an activator solution of this invention. The activator contained an alkali and 4.0 gram per liter of potassium iodide. As can be seen, the figure comprises a graph in which the horizontal, i.e., "a" axis, represents the image tone of a black-and-white photographic print as it passes from a "green" to a "red" tone. More important for this invention, the vertical, i.e., "b" axis, represents the image tone of a black-and-white photographic print along a scale from a "cold", that is, a blue tone, to a yellow or "warm" tone.

There is a locus on the chart indicated by a square having the designation "A" that shows the image tone achieved when the processor was used without the cold image tone-providing compound of this invention. (As can be seen, the locus is very near the intersection of both axes.

Below the horizontal axis, and between the values of −1 and −2 on the vertical axis, is a mark indicating the image tone range obtained when potassium iodide was used in accordance with this invention. The KI concentration in the activating solution was 4.0 grams per liter. As can be seen, there is a marked change in coldness of tone when KI is used as a tone-providing compound as taught herein.

In practice, the difference in tone is even more pronounced. Without a tone-providing agent, the print tone becomes warmer (in an uncontrolled fashion) after seasoning, i.e., after 25, 50, or so prints are made. In other words, when the processor is used with processing chemical made available prior to this invention, most of the prints obtained have a tone such as illustrated by point (B) which may be up to about one or one and one-half units higher than indicated by point labeled "A" in FIG. 3. Consequently, this invention provides much colder image tones than obtained in ordinary practice prior to this invention.

The close cluster of the image tone values near the −1.5 cold tone region of the plot indicates the ability of the image tone-providing compound of this invention to maintain the image tone over a relatively large number of photographic prints. The various values observed were obtained at the start, and after 250, 500, 750, and 1000 prints. As can be seen, the image tone is maintained in a narrow range from the first to the one-thousandth print. Thus, a small amount of an image tone-providing compound of this invention was able to maintain the image tone within a narrow range over the design life of the batch chemicals used for the processor.

The compositions of the activator, stop bath, and fixer that were employed in the investigation summarized by FIG. 3 are given in the description of the invention below.

DESCRIPTION OF PREFERRED EMBODIMENTS

In a preferred embodiment, this invention provides a process for increasing the coldness of an image tone, and maintaining said tone in a narrow image tone range in a large number of black-and-white photographic prints made on developer incorporated, resin-coated photographic paper by an automatic photographic film processor having activate, stop, fix, wash, and dry stations and means for moving said paper through said stations to produce said prints; said process comprising activating said paper at said activate station of said processor with an alkaline activator containing from about 1.0 to about 8.0 grams per liter of an alkali metal iodide.

In a related embodiment, this invention provides a process for extending the use life of the processing chemicals employed in a rapid access processor for producing multiple photographic prints from developer incorporated, resin-coated paper, such that said processing chemicals are able to produce a desired cold image tone within an acceptable range for a greater number of prints using a batch of chemicals; said process comprising activating said paper at the activate station of said processor with an alkaline activator having incorporated therein from about 1.0 to about 8.0 grams per liter of an alkali metal iodide.

In another embodiment, this invention provides a composition for activating a developer incorporated photographic paper for making black-and-white prints and for maintaining the coldness of the tone of said prints said composition comprising an alkaline activator admixed with a cold image tone maintaining amount of an alkali metal iodide. The composition is suitable for use in an automated processor for making a large number of prints by the activation process.

The compositions of this invention are designed for use with developer incorporated paper. The compositions contain sufficient alkali to activate the developer in the paper. In addition to the activator, the compositions preferably have a preservative quantity of a source of sulfite ions. In a still more highly preferred embodiment, the compositions also contain an antifogging agent. The compositions also preferably contain a sequestering agent to obviate or substantially obviate problems associated with water hardness.

Cold tone-providing agents of this invention are metallic iodides, particularly alkali metal iodides such as lithium iodide, sodium iodide, and potassium iodide. The latter is preferred. Especially when a lighter metal iodide is used, e.g., lithium iodide, less weight of metal iodide may be used. Thus, somewhat less than 1.0 g/l need be used; e.g., one may use about 0.5 g/l of LiI.

The above-described tone-providing agents are employed n activation step of the process. In a preferred embodiment, KI or similar agent is incorporated in the activator composition. This can be accomplished by admixing the tone-providing agent with the activator ingredients when the activator composition is formulated. Alternatively, it can be accomplished by adding the toning agent to pre-formed activator.

The activator compositions of this invention generally comprise enough alkali to confer a pH of from about 10 to about 14.5, more preferably from about 12 to about 14.5. A wide variety of alkalis can be used.

Alkaline activators which are suitable include inorganic alkali such as (a) alkali metal hydroxides, especially sodium hydroxide, potassium hydroxide and/or lithium hydroxide, (b) alkali metal carbonates, such as sodium carbonate and potassium carbonate, (c) sodium or potassium phosphates, (d) organic alkaline development activators such as quaternary ammonium bases and salts, (e) alkanolamines such as ethanol amine, and (f) similar alkaline materials and/or alkali releasing materials.

Of these materials, the alkali metal hydroxides are preferred, potassium hydroxide is most preferred.

In the inventive compositions, the KOH or other alkaline substance activates the developer (e.g., hydroquinone) incorporated in the paper. The amount of KOH can be varied somewhat, so long as it provides a sufficiently basic pH to cause development to take Place, and to tie up the hydrogen ions split off from the developer so that recombination of such ions with the developer does not take place to a deleterious extent.

It is known in the photographic arts, that alkalis can be substituted for one another under certain circumstances, and still achieve similar photographic results. The equivalence of hydroxides and carbonates in developers is discussed on pages 251–254 of G. Haist, *Modern Photographic Processing,* Vol 1, John Wiley and Sons, New York, N.Y. (1974).

The activator solutions of this invention preferably include a sulfite ion source to act as a preservative. As is known in the photographic arts, the sulfite ion has numerous functions; confer Haist, supra: pages 220–233. The use of sodium and potassium metabisulfite and sodium sulfite; $Na_2S_2O_5$, $K_2S_2O_5$, and $Na_2SO_3$, respectively, is discussed on page 230. In the instant invention, the stabilizer is believed to reduce the amount of sludge formation during the preparation of prints by the process of this invention.

As discussed by Haist, it is known in the art that sodium or potassium metabisulfite can replace sodium sulfite, because these compounds are converted to sulfite ions in alkaline solution. One hundred grams of sodium sulfite may be replaced by only 44 g of potassium metabisulfite. Because of the acid character of the metabisulfite, for each 10 g of metabisulfite used, 3.6 g of sodium hydroxide, or 9.5 g of anhydrous sodium carbonate will be needed to maintain the same solution alkalinity.

On the other hand, metabisulfites in solution yield the acidic bisulfite ion, $HSO_3^-$. When neutralized with an alkali, the sulfite ion, $SO_3^{2-2}$ formed. Thus, the less expensive, more available, and more soluble sodium bisulfite, $NaHSO_3$, may be used to instead of sodium or potassium metabisulfite.

For this invention, alkali metal metabisulfites are preferred, with sodium metabisulfite being a preferred compound of this type. The concentration is from about 10 to about 20 grams per liter.

The preferred compositions of this invention comprise an antifoggant. The antifoggant may be sodium or potassium bromide; however, other antifoggants can be used. Some important antifoggants listed by Haist are:

sodium anthroquinone sulfonate benzotriazole
5 methylbenzotriazole
6 nitrobenzimidazole
2 benzoxazolethiol
2 benzimidazolethiol An antifoggant quantity of such materials may be incorporated in the compositions of this invention.

As discussed by Haist, supra, page 265, the exact amount of antifoggant to be added to a developer is the minimum amount to suppress fog without causing unacceptable loss of emulsion speed and image density. This quantity depends on so many factors that usually it has to be determined empirically.

In a preferred embodiment, the activator compositions of this invention also contain an inorganic or organic sequesterant to minimize difficulties due to water hardness. With regard to inorganic sequesterants, the polyphosphates such as sodium tetraphosphate, $Na_6P_4O_{13}$, sodium tripolyphosphate $Na_5P_3O_{10}$, and sodium trimetaphosphate, $Na_3P_3O_9$ can be used, as can materials which are polymeric forms of sodium metaphosphate, viz $Na(PO_3)_n$, wherein n is six or greater. These materials are generally used in quantities of from about 0.5 to about 2.0 g of phosphate per liter.

Applicable organic sequesterants include ethylenediaminetetraacetic acid and the alkali metal salts thereof. Diethylenetriaminepentaacetic acid, and triethylenetetraminehexacetic, and sodium salts of these acids, are other examples of organic sequesterants. They are generally used in an amount of from about 1.5 to about 2.5 grams per liter.

A preferred activator/image tone-providing composition of this invention is made as follows:

First, 600 grams of water, 1 gram of ethylene diamine tetraacetic acid disodium salt, 218.4 grams of potassium hydroxide,
14.6 grams of sodium metabisulfite,
2.0 grams of potassium bromide, and
1.0–8.0 grams of potassium iodide are combined to dissolve the solids, and then the resultant solution is admixed with sufficient water to make one liter.

Activation

To employ the above described compositions of this invention using the aforementioned commercial processor, the exposed print (on resin-coated, water-resistant, developer-incorporated paper) is placed emulsion-side-down on the feed tray, where it enters the processor. The first pair of rollers are dry rollers in contact, and serve to transport the print down into the activator solution. The highly alkaline activator enters the developer-incorporated emulsion and develops the image in slightly less than nine seconds, including travel time. The activator does not require an elevated temperature-it operates in the range of 65° to 75° F. (18.5° to 24° C.) with a tolerance of ±5° F. (±3° C.) around any temperature in the range. The activator is kept within the range by incoming tap water on its way to the wash section of the processor. However, because tap water often exceeds this temperature range, a thermostatically controlled mixing valve is furnished. The print leaves the activator via the last pair of transport rollers in the activator section. These rollers are in contact and act as squeegees, removing excess activator from the print.

Stop

The first pair of transport rollers in the stop bath feed the print down into the stop bath solution, which requires about five seconds to stop the developing action and to neutralize the alkalinity of the activator remaining in the print emulsion. It operates at a temperature range of approximately 65° to 85° F. (18.5° to 29.5° C.).

Generally speaking, the stop bath is an aqueous solution of an acid. For this invention, a preferred stop bath is made by mixing 189 grams of glacial acetic acid and 839 grams of water.

Fix

The three major processing factors that determine the time of a fixing process are (1) formula, (2) temperature, and (3) agitation. A time efficient fixing ingredient for use in this invention is ammonium thiosulfate. For use in this invention, that compound is supplied as KODAK ROYALPRINT Fixer. There is a certain concentration of fixing agent that fixes fastest; it is neither the least nor the greatest concentration possible, but is at a certain intermediate level. When the ROYALPRINT Fixer concentrate is diluted 1 to 3 with water, the best concentration is achieved. Increasing the temperature increases the fixation rate. The temperature of the fixer is kept at a nominal 110° F. (43.5° C.).

In the described apparatus, the print is fixed using fountain agitation in a narrow chamber, about 3/16 inch (5 mm) in height. The high-turbulence, fountain-jet agitation in the relatively low height chamber helps fix the paper rapidly for two reasons. By keeping the paper close to jet openings, the rate of agitation is increased. By keeping the volume of the chamber relatively small, the rate of change of the fixer in the chamber is increased.

The fixer is able to fix the print completely in about 10 seconds because of the combination of formulation, concentration, temperature, and highly efficient agitation.

The ROYALPRINT fixer concentrate comprises:

1145.4 g ammonium thiosulfate, 58% solution
20.5 g sodium metabisulfite
3.0 g glacial acetic acid, and
water to make one liter The pH is 5.8 ±0.1. For use, 250 ml of concentrate is diluted to one liter with water.

Wash

Complete washing takes place in the last wet section of the ROYALPRINT Processor in slightly more than eight seconds. There are four reasons why this can be accomplished:

(a) The squeegee action of the feed rollers, which removes most of the fixer from the print surfaces.

(b) The water resistant paper base.

(c) The high-turbulence fountain-jet wash-water application.

(d) A final clear-water rinse.

As the print leaves the fixing section, it is transported by two pairs of transport rollers. These rollers serve a second function; as well as moving the print along, they double-squeegee the fixer from the print, leaving very little surface fixer on the print as it enters the wash.

The water-resistant base does not allow the fixer to penetrate the paper fibers. Therefore, the back surface of the print needs only a rinse to eliminate any residual surface fixer, and the fixer needs to be removed only from the relatively thin, porous gelatin emulsion.

Agitation of the wash water is provided by fountain jets, which are arranged in the same way as the jets in the fixer section. Because of the small amount of fixer to be removed, fresh water needs to be introduced into the wash section at the relatively low rate of a half-gallon per minute, thus saving water and energy. The relatively high pressure of the water coming out of the fountain jets is supplied by a pump and does not depend on having a high water pressure at the tap.

As the print leaves the wash chamber, it passes through two transport rollers which also act as squeegee rollers removing any surface water. The print then enters a clear-water rinse. It is submerged in clear water so that both surfaces get a last, fresh-water rinse before going to the drying section.

Water from the tap enters this rinse chamber first, and as it leaves the rinse tray, it overflows into the wash sump for use in the pressure wash.

Dry

As the paper leaves the wash section on its way into the drying section of the processor, it is squeegeed twice by transport rollers and little surface water is left. In the drying section, air at 155° to 160° F. (68.5° to 71° C.) is applied to the prints. Because of the water-resistant paper base, only the slight amount of surface water and the water in the emulsion have to be removed. Drying takes place in less than 15 seconds, and the completely dry prints (8×10 inch [20.3×25.5 cm]) emerge from the processor feed station.

For the aforementioned commercial processor, the approximate process cycle can be summarized by the following table:

TABLE I

KODAK ROYALPRINT Processor, Model 417

| PROCESS CYCLE (approximate) | Path Length (inches) | Process Time (seconds) |
|---|---|---|
| Activator | 10.7 | 8.9 |
| Stop | 6.5 | 5.4 |
| Fix | 12.0 | 10.0 |
| Incoming Wash Water | 10.0 | 8.3 |
| Dry | 17.0 | 14.2 |

The results summarized in FIG. 3 were obtained using KODAK POLYCONTRAST RAPID II RC paper. Other paper such as mentioned above may give a somewhat different tone.

Similar results to those discussed or reported above are obtained if other alkali metal iodides are substituted for potassium iodide.

The invention has been described above with particular reference to preferred embodiments. A skilled practitioner familiar with the above-detailed description can make many substitutions or changes without departing from the scope and spirit of the appended claims.

I claim:

1. A process for improving the image tone of a large number of black-and-white photographic prints made by an automated processor employing (a) the activation process to prepare said prints from activator incorporated, resin-coated photographic paper and (b) a batch of processing chemicals;

said process comprising activating said paper at the activate section of said processor with an alkaline activator containing from about 1.0 to about 8.0 grams per liter of an alkali metal iodide.

2. Process according to claim 1 wherein said iodide is potassium iodide.

3. Process according to claim 2 wherein said iodide is added as an aqueous solution to an alkaline activator.

* * * * *